Figure 1:
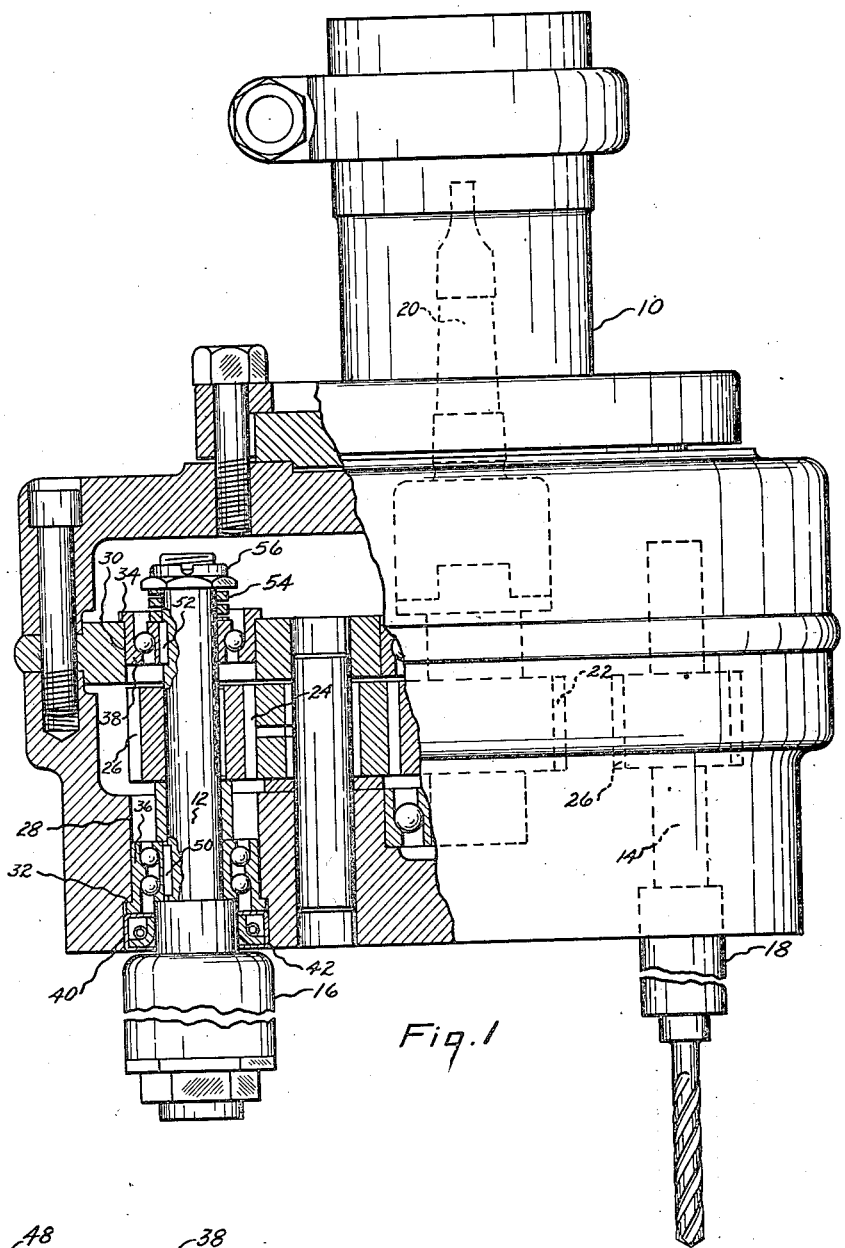

Jan. 19, 1937.  J. F. BUHR  2,068,594
BEARING STRUCTURE FOR ROTATABLE SPINDLES AND THE LIKE
Filed June 13, 1934  2 Sheets-Sheet 1

Inventor
Joseph F. Buhr
By Beaman & Langford
Attorney

Jan. 19, 1937.  J. F. BUHR  2,068,594
BEARING STRUCTURE FOR ROTATABLE SPINDLES AND THE LIKE
Filed June 13, 1934  2 Sheets-Sheet 2

Inventor
Joseph F. Buhr
By Beaman & Langford
Attorney

Patented Jan. 19, 1937

2,068,594

UNITED STATES PATENT OFFICE 2,068,594

BEARING STRUCTURE FOR ROTATABLE SPINDLES AND THE LIKE

Joseph F. Buhr, Ann Arbor, Mich., assignor to Buhr Machine Tool Company, Ann Arbor, Mich.

Application June 13, 1934, Serial No. 730,431

4 Claims. (Cl. 77—22)

The present invention relates to improvements in bearing structures and constitutes a continuation in part of my co-pending application, Serial No. 599,530, filed March 17, 1932.

In spindles, particularly in tool carrying spindles, rigidity, accuracy, and ability to be rotated at high speed without vibration are prerequisite. With present increased spindle speeds it is necessary to resort to precision anti-friction bearings which has materially increased the cost of construction along conventional lines.

It becomes the object of the present invention to provide an improved bearing structure for a rotatable spindle or similar structure which materially reduces the number of operations in the machining of the housing, which reduces set up expense and assures true alignment and accuracy, which greatly simplifies assembly and disassembly, which is particularly adapted to facilitate preloading, and which gives rigidity of construction to a degree meeting all operating conditions of wear, expansion and contraction of parts, and sudden release of axial load as occur, for example, on the sudden breaking through the work by the tool carried by the spindle.

According to the invention by providing flanged ball bearing structures the machine housing can be bored and ground straight through as plain cylindrical holes as distinguished from the present practice of providing inside shoulders in the housing. This reduces the necessity of changing the set up, reduces run-out to a minimum and assures the best possible alignment of the bearings. In spindles, particularly in multiply spindle heads in which each tool carrying spindle is individually mounted, it is advantageous to preload the bearings thereof to provide rigidity of construction and accurate operation. In the present invention preloading of the bearings, positive driving of the inner bearing races, and provision for axial expansion and contraction are all provided for and in a manner resulting in the simplification of bearing and spindle structure assembly to a degree heretofore unaccomplished.

Another object of the invention resides in the preloading of bearing structures of tool carrying spindles to a degree obviating irregular feeding of the tool upon sudden release in pressure.

These and other objects residing in the combination and arrangement and construction of parts will appear in the course of the following detailed description. The invention is clearly defined in the appended claims and for this reason the several embodiments shown in the drawings and specifically described herein are to be considered as only illustrative of the invention and not as limiting the same to the details shown and described.

Figure 2:
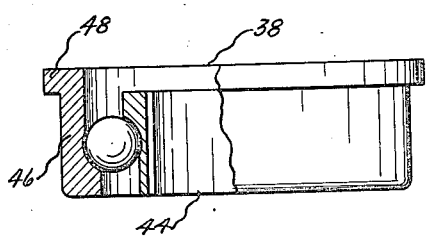
Figures 3, 4:
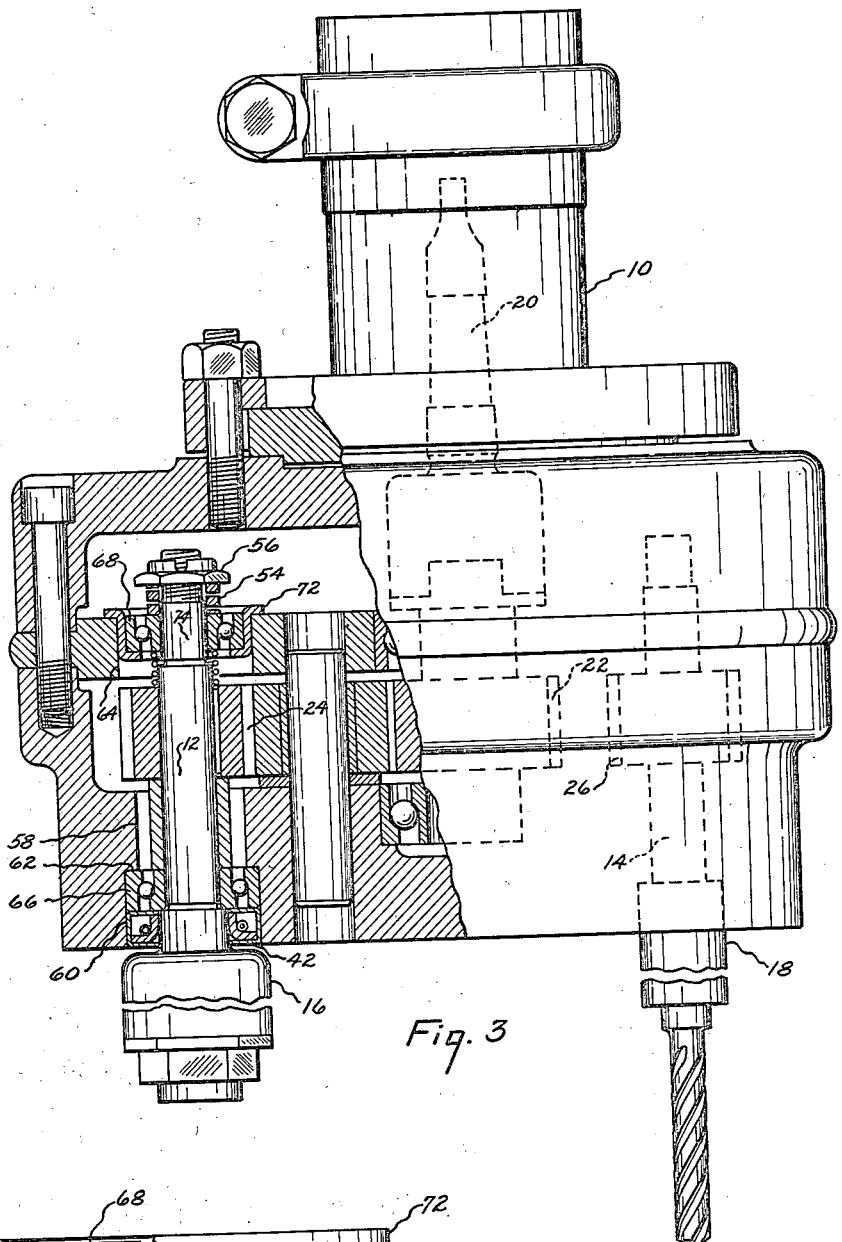

In the drawings,

Fig. 1 is a side elevation view, partially shown in broken cross section, of a multiple spindle drilling and tapping head embodying my preferred form of bearing and spindle assembly structure, Fig. 2 is a side elevation partially shown in cross section of the preferred form of flanged bearing structure, Fig. 3 is a view similar to Fig. 1 of a modified form of bearing and spindle assembly structure, and Fig. 4 is a view similar to Fig. 2 of a modified flanged bearing structure.

Although my improved bearing and spindle assembly structure is illustrated in connection with a multiple spindle head, it is obviously not limited to any particular type of spindle and has broad application in the field of anti-friction bearings for rotatable members. However, certain features of the invention are particularly related to tool spindles, particularly the tool carrying spindles of multiple spindle drilling and tapping heads, and for this reason the invention is shown embodied in the type of construction and the detailed description is thus directed.

Having specific reference to the drawings, a multiple spindle head 10 is shown with spindles 12—14 having tool receiving sockets 16—18, respectively. A central driving stud 20, through suitable gearings 22—24—26, drives the spindles 12—14. This construction forms no part of the present invention.

In the preferred form of the invention a machine housing is bored and ground straight through as plain cylindrical holes such as at 28—30 providing shoulders 32—34 against which the flanges of the outer races of the ball bearings 36—38 abut. As illustrated the housing is counterbored at 40 to provide the shoulder 32 and to accommodate an oil seal 42. In many instances, particularly in the case of horizontal spindles, the flanges of both outer races will abut the outer face of the casting as in the case of the bearing 38. This confines the extent of boring to a single set up for the bearing structure and results in reducing expenses and assures true alignment of the spaced bearings.

The particular design of the bearing may vary considerably. As shown in Fig. 2, the upper bearing 38 is a single ball row, angular contact, with an inner race 44 and an outer race 46 having a flange 48, on the non-thrust side. The bearings may be separable or otherwise depending upon the design. An advantage in separable bearings resides in the ability to remove the outer race from the inner race and to apply as individual units in the machine housing. This facilitates assembly and disassembly in many cases.

Because of the straight through boring of the housing, the outer bearing races are of the same diameter and likewise the inner bearing races with the result that the journaled spindle portion 12 can be of one diameter throughout. As the lower bearing 36 is under the greater load stresses during operation, a double row of balls may be provided. In order to drive the inner races of the bearings and to permit creeping between the inner race of the bearing 38 and the spindle 12, as will be hereinafter discussed, the inner races are preferably keyed to the spindle 12 as at 50—52. Obviously, if desired, the inner races of the lower bearing 36 may be press fitted upon the spindle and frictionally driven as it is only necessary to provide for relative axial movement or creeping between the inner race of the upper bearing 38 and the spindle in order to compensate for expansion and contraction and to permit effective preloading.

With at least the inner race of the upper bearing 38 keyed to the spindle 12 for positive driving and axial creeping, the bearing assembly may be conveniently and effectively preloaded to give a degree of rigidity and accuracy of spindle operation heretofore unknown. As illustrated, preloading of the bearing is accomplished in a simple manner by insertion of a stiff spring 54 over the threaded end of the spindle 12 into abutting relation with the inner race of the upper bearing 38. The degree of preloading is determined by the manipulation of the nut 56 which may be held against rotation relative to the spindle, following adjustment, in any suitable manner. It is realized that it is known to employ resilient means to compensate for wearing in spindle bearing assembly. However, according to the present invention the preloading of the spindles of multiple spindle drilling and tapping units is carried out to a degree heretofore unappreciated as beneficial to performance and which has produced new and unexpected results.

Under axial loads deflection of the ball bearings as well as the entire bearing structure results. Also, unless provided against, at the time of axial load take up, a certain amount of axial movement takes place due to wearing and inaccuracies of parts. In spindle structures in which a tool is axially fed, particularly in multiple spindle drilling and tapping units, such axial movement is extremely detrimental to the work and tools for upon sudden release of the load as at breaking through the work, and a back lash results which may cause the tool to take a larger bite than desired or for which the tool is designed. It has been found that axial deflection of the ball bearing is not proportionate to the axial load for the reason that, as the balls and races are deformed, the contact area increases. In practice, the preloading of the bearing structure is carried out beyond the point of objectionable axial deflection or displacement under maximum working load with the result that no appreciable back lash results upon sudden release of load upon the spindle. Without limiting the scope of the invention as above defined, bearing assemblies in multiple spindle drilling and tapping units preloaded to approximately 80% of their maximum axial thrust load carrying capacity, have proven extremely successful. With this degree of preloading, it has been found that the inner race of the upper bearing 36 may be frictionally driven satisfactorily without being keyed to the spindle. Also, it is to be appreciated that with such a degree of preloading precise alignment of the bearings is required and is practically and inexpensively provided through the ability to bore straight through the housing of the machine at one set up and to align and support the flanged outer bearing races directly in the bored cylindrical hole or holes. In spindles other than drilling and tapping units, preloading to a lesser degree is sufficient and in such cases, driving the inner races or races of the bearings by keys is necessary and desired.

In Figs. 3 and 4 is shown a modified form of the invention in which standard bearings may be employed in lieu of a bearing having a flanged outer race. The housing is first machined to provide a cylindrical bore 58 of one diameter. Then the housing is counterbored to provide a cylindrical bore 60 of a larger diameter resulting in the provision of a shoulder 62. Upon completion of the bore 60, from the same set up, the boring tool is passed through, in a well known manner, and the bore 64 machined in accurate alignment with the bore 60 and of the same diameter. A standard bearing 66 is suitably located in the bore 60 with the outer race abutting the shoulder 62. The upper bearing consists of a standard bearing 68 supported within a flanged cupped shaped stamping 70 having a flange 72 adapted to be supported upon the face of the housing. As the bores 60 and 64 are of the same diameter the bearing 68 is necessarily smaller than the bearing 66 with the result that the diameter of the spindle 12 is reduced at 14 to receive the smaller inner race. In this respect this construction does not possess the advantages of that illustrated in Figs. 1 and 2. The inner race of the bearings 66 and 68 may be positively driven and provision made for creeping in the manner heretofore described with reference to Figs. 1 and 2; the outer races of the bearings being fixedly located in the housing and the flanged stamping 70 by press fitting or other suitable manner. Obviously in certain cases it will be found advantageous to locate both bearings in flanged stampings in the manner of the bearing 68. Preloading of the bearing structure shown in Fig. 3 may be identical with that of the structure of Fig. 1.

Having thus described my invention what I claim as new and desire to protect by Letters Patent is:

1. In a machine housing of the class described, a bearing structure and spindle assembly comprising means having a pair exactly aligned spaced cylindrical bore portions of the same diameter such as result from a straight through boring operation from a single machine tool set up, a pair of spaced bearings having inner and outer ball races located in said bores and having at least one of said bearings supported at the outer end of one of said bore portions with the major portion of said bearing aligned by the wall of the bore portion, resiliently applied means for preloading said bearings through said spindle through the range of relatively large deflections of said bearings per increment of axial load, said means being applied against the inner race of said bearing supported at its outer end and in substantially the plane of axial support of said bearing.

2. A method of preloading spindle ball bearing structures and the like to obviate axial movement upon release of the working load comprising the step of applying a permanent axial load upon the bearing structure equal to approximately 80% of the maximum axial thrust load capacity of the bearing structure whereby deflection of the bearing structure through its relative large deflections per increment of axial load is effected.

3. In combination, a machine tool head axially fed during operation, a plurality of rotatable tool carrying spindles axially disposed in said head, the lower portions of said spindles extending below said head to receive an axially fed tool and the upper and intermediate portions of said spindles being housed in said head, axially spaced aligned upper and lower bore portions defined in said head, upper and lower outer ball bearing races aligned and supported in said bore portions, upper and lower inner ball bearing races, balls aligning said inner races in said outer races, the upper and intermediate portions of said spindles being carried within said inner races, driving connections between said spindles and said inner races, said lower inner races and spindles being relatively fixed with respect to axial movement, said upper inner races and spindles being capable of relative axial movement, resiliently applied means carried by the upper portions of said spindles and acting through said upper races to preload the bearing structure, said means being of a design capable of preloading said lower bearing through its range of relatively large deflections per increment of axial load as distinguished from merely taking up of end play and wear of bearing structure, said means retaining said spindles and bearing structure in assembled relation, and obviating run out of said inner races, and means driving said spindles and engageable therewith between said upper and lower bearing structures.

4. In combination, a machine tool head axially fed during operation, a rotatable tool carrying spindle axially disposed in said head, the lower portion of said spindle extending below said head to receive an axially fed tool and the upper and intermediate portions of said spindle being housed in said head, axially spaced aligned upper and lower bore portions defined in said head, upper and lower outer ball bearing races aligned and supported in said bore portions, upper and lower inner ball bearing races, balls aligning said inner races in said outer races, the upper and intermediate portion of said spindle being carried within said inner races, said lower inner race and spindle being relatively fixed with respect to axial movement, said upper inner race and spindle being capable of relative axial movement, resiliently applied means acting through said spindle to preload the bearing structure, said means being of a design capable of preloading said lower bearing through its range of relatively large deflections per increment of axial load as distinguished from merely taking up of end play and wear of bearing structure, said means retaining said spindle and bearing structure in assembled relation, and obviating run out of said inner races.

JOSEPH F. BUHR.